Figure 1:
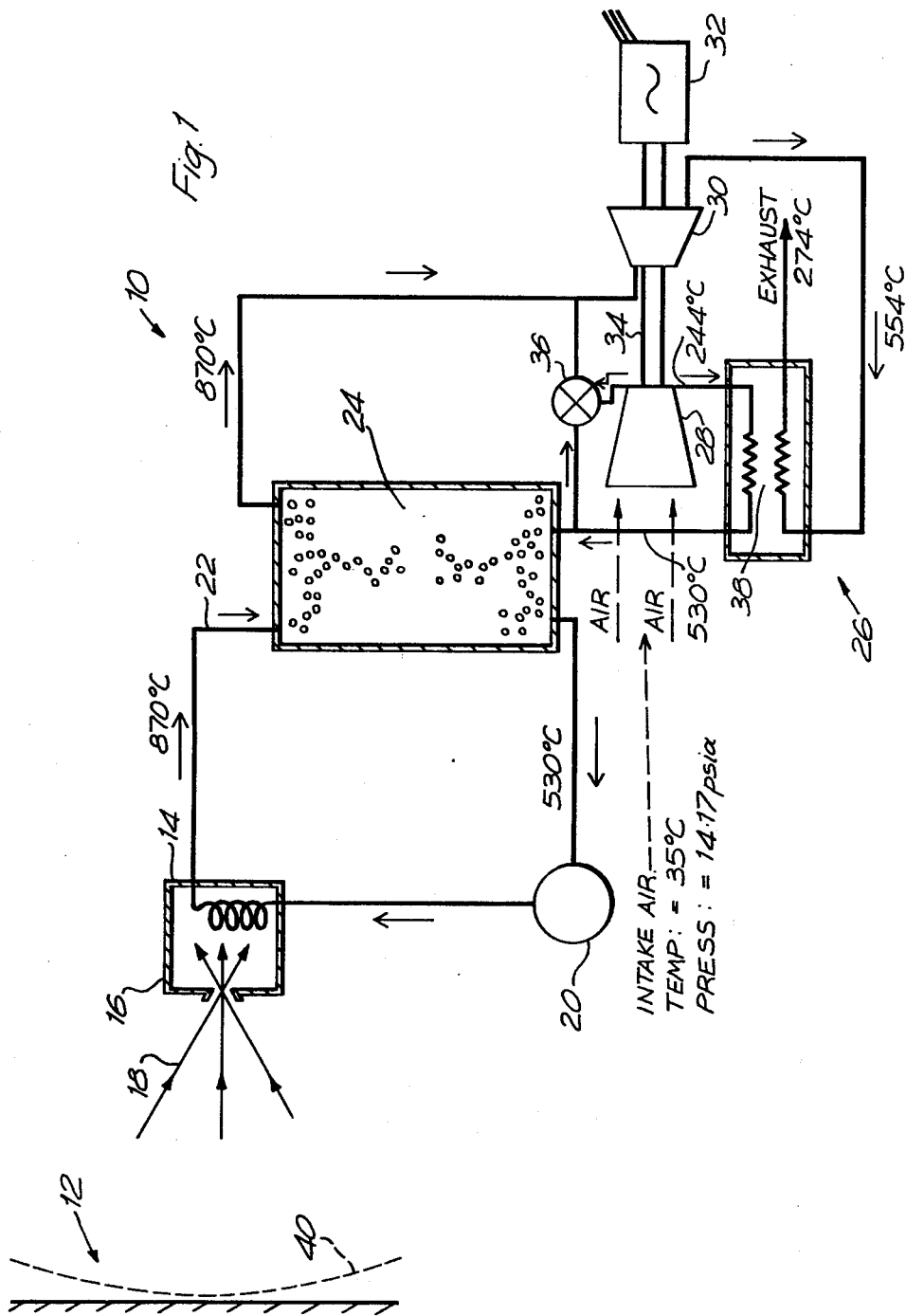

United States Patent [19]

Jubb et al.

[11] 4,262,484

[45] Apr. 21, 1981

[54] GAS TURBINE ENGINE POWER PLANT USING SOLAR ENERGY AS A HEAT SOURCE

[75] Inventors: Albert Jubb; Eric W. Stansbury, both of Kenilworth, England

[73] Assignee: Rolls-Royce Limited, London, England

[21] Appl. No.: 951,253

[22] Filed: Oct. 13, 1978

[30] Foreign Application Priority Data

Oct. 18, 1977 [GB] United Kingdom ............... 43238/77

[51] Int. Cl.³ ............................................... F03G 7/02
[52] U.S. Cl. ......................................... 60/641; 60/659; 60/682; 126/436; 126/438
[58] Field of Search ................. 60/641, 650, 682, 659; 126/400, 436, 438

[56] References Cited

U.S. PATENT DOCUMENTS

| | | | |
|---|---|---|---|
| 2,872,915 | 2/1959 | Bowen | 60/641 |
| 3,868,823 | 3/1975 | Russell, Jr. et al. | 60/641 |
| 3,924,604 | 12/1975 | Anderson | 126/438 X |
| 4,044,753 | 8/1977 | Fletcher et al. | 60/641 X |
| 4,167,856 | 9/1979 | Seidel et al. | 60/641 |
| 4,172,491 | 10/1979 | Rice | 60/659 X |
| 4,189,922 | 2/1980 | Bellofatto | 60/659 X |

FOREIGN PATENT DOCUMENTS

| | | | |
|---|---|---|---|
| 2744970 | 4/1979 | Fed. Rep. of Germany | 60/641 |
| 1122344 | 9/1956 | France | 60/641 |
| 1374397 | 8/1964 | France | 126/438 |

*Primary Examiner*—Allen M. Ostrager
*Assistant Examiner*—Stephen F. Husar
*Attorney, Agent, or Firm*—Cushman, Darby & Cushman

[57] ABSTRACT

The working medium of a gas turbine engine power plant is heated indirectly by energy derived by solar radiation, the power plant comprising radiant energy collecting means, radiant energy receiving means, radiant energy heat transfer means, a relatively large capacity pressurized heat store and a gas turbine engine in which the compressed air is heated by heat energy in the heat store.

7 Claims, 4 Drawing Figures

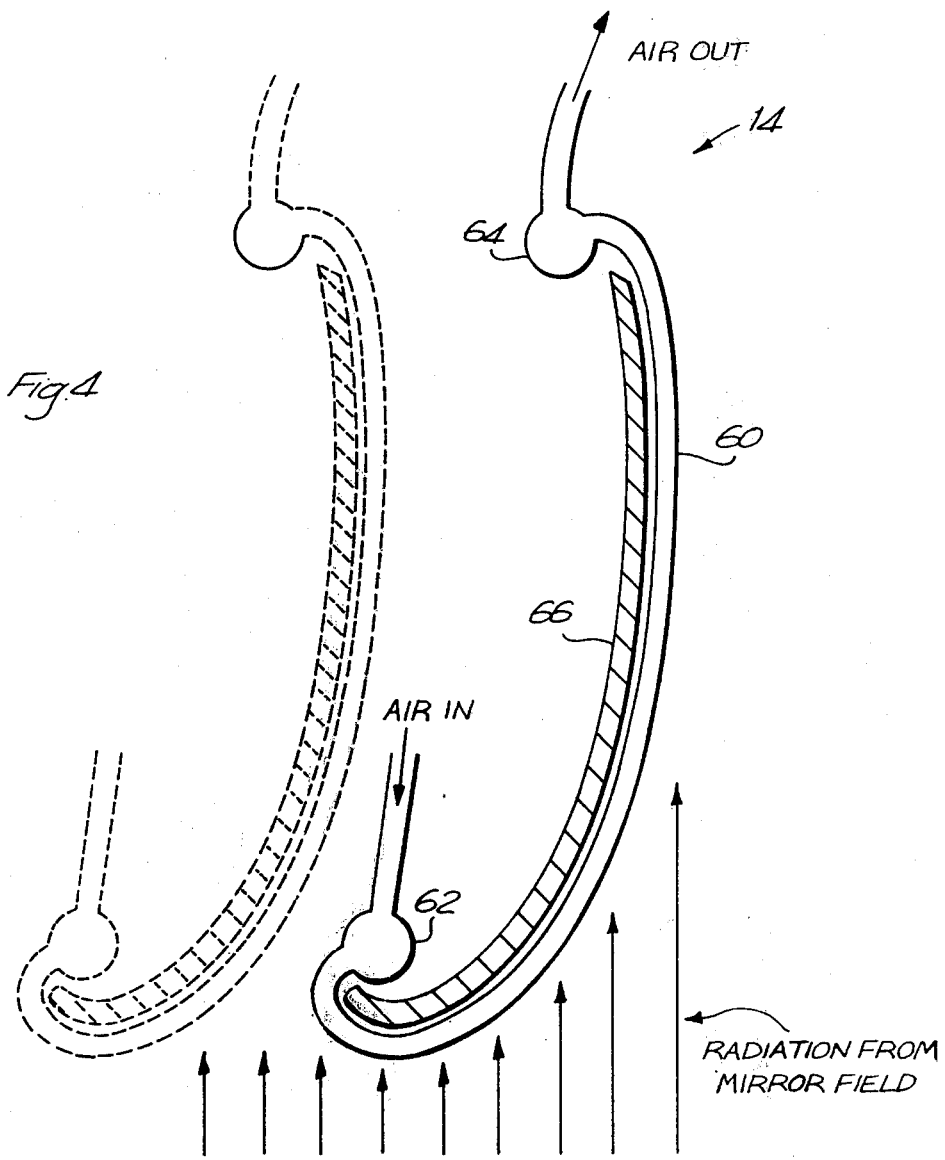

GAS TURBINE ENGINE POWER PLANT USING SOLAR ENERGY AS A HEAT SOURCE

This invention relates to gas turbine engine power plant in which the working medium of the gas turbine is heated by solar energy.

The present invention provides a solar energy powered gas turbine engine power plant including radiant energy collecting and directing means, radiant energy receiving means, radiant energy heat transfer means, a relatively large capacity pressurised heat store and a gas turbine engine power plant, the working medium of which is heated by the heat energy in the heat store.

The radiant energy collecting and directing means may comprise a plurality of hexagonal shaped mirrors, each comprising a plurality of subsidiary mirrors which are each in the shape of an equi-lateral triangle. In a preferred arrangement, the mirrors are laid out in an approximately circular form, the mirrors in each quadrant of the circle being continually focussed onto one of four radiant energy receiving means, the mirrors being located at ground level and the radiant energy receiving means being located on a tower.

The radiant energy receiving means may comprise one or more banks of tubes onto which the radiant energy falls and through which a heat transfer medium is pumped, the tubes forming part of a closed loop heat transfer line which includes the large capacity pressurised heat store.

The heat store may comprise a pressurised insulated, reinforced concrete vessel containing a heat retaining medium, such as crushed rock and/or brick which receives heat from the heat transfer medium in the closed loop.

The gas turbine power plant may comprise a compressor, a turbine and a load, such as an alternator all mounted on a common shaft, the compressor delivery air passing through the heat store in direct contact with the heat retaining medium and being heated thereby. The heated air then flowing through the turbine which drives the compressor and the load. The turbine exhaust gas may flow through a heat exchanger to preheat the compressor delivery air before it flows through the pressurised heat store.

The term "relatively large" heat store means a heat store which has sufficient capacity for the gas turbine power plant to produce a constant output for an order of 24 hours per day assuming that sufficient solar energy is available during the daylight hours for conversion into heat energy to be retained in the heat store.

Figure 2:
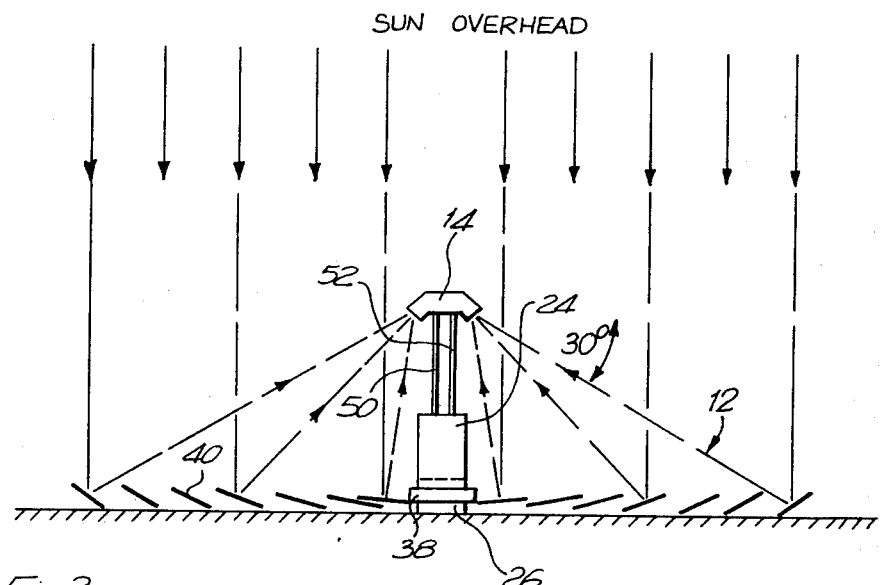
Figure 3:
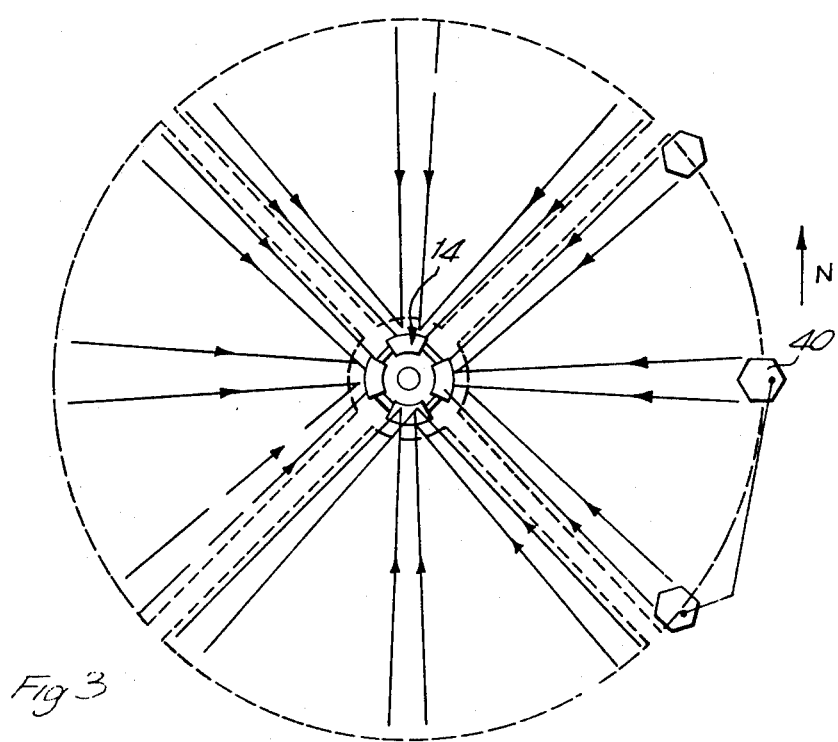

The present invention will now be more particularly described with reference to the accompanying drawings in which:

FIG. 1 shows diagrammatic layout of one form of solar energy power plant according to the present invention, FIG. 2 shows a diagrammatic elevation of the solar energy power plant shown in FIG. 1, FIG. 3 is a plan view of the arrangement shown in FIG. 2, and FIG. 4 is a detail view of the heat receiver and exchanger of the power plant shown in FIGS. 1 to 3.

Referring to FIG. 1, a solar energy power plant 10 of output IMW continuous over 24 hours per day comprises a mirror field 12, the rays from which are directed onto four interconnected heat receivers (FIG. 3) 14 which are enclosed within an insulated container 16 having four apertures 18 for the respective heat receivers. A pump or fan 20 circulates a heat exchange medium, e.g. pressurised air through a loop 22 which includes the heat receivers 14 and a large capacity pressurised heat store 24.

The heat store 24 supplies the heat energy for a gas turbine power plant 26 which comprises a compressor 28, turbine 30 and alternator 32 all mounted on a common shaft 34. A by-pass valve 36 is provided in the compressor delivery line to control the proportion of compressor delivery air flowing through the heat store 24 and a heat exchanger 38 using the turbine exhaust gas is used to preheat the compressor delivery air before it passes into the heat store 24.

The mirror field 12 consists of six hundred hexagonal mirrors 40, each mirror being built up from fifty four equilateral triangles, each heat receiver 14 dealing with a quarter of the mirror field. The mirrors 40 are movably supported on a space frame (not shown) and have control means (not shown) so that the mirrors can continuously focus the suns rays into the respective apertures 18 of the heat receivers as the sun traverses the sky.

The aperture 18 in each insulated container 16 should be as small as possible in order to reduce the loss due to re-radiation. The effects of wind on the mirrors, the spherical aberration of mirrors with light at large angles to the mirror axes, bending of light rays by hot air refraction and errors in sun-tracking all combine to produce an entering cone of energy, the focus of which will move. In order to cope with this movement and to keep each aperture as small as possible, the aperture is made variable in size by means of a series of metal leaves, in effect an iris which is arranged so that the centre of the aperture can follow the focus of the energy cone.

The four heat receivers are mounted on a tower 50 which is about 200 feet high and carries pipes 52 of the loop 22 between the heat receivers 14 and the heat store 24 which is mounted above the gas turbine power plant 26 and the heat exchanger 38 which are both at ground level.

The heat receivers 14, which are more fully disclosed in the copending U.S. application Ser. No. 951,254, filed Oct. 13, 1978, by Albert Jubb and Eric W. Stansbury, and now U.S. Pat. No. 4,222,369, issued Sept. 16, 1980, and in the copending U.S. application Ser. No. 952,215, filed Oct. 17, 1978, by Albert Jubb, and now U.S. Pat. No. 4,222,367, issued Sept. 16, 1980. Both of the aforementioned patents and this application are commonly owned by Rolls-Royce Limited, Derby, England. comprise a bank or banks of tubes 60 (FIG. 4) for the throughflow heat transfer medium with associated inlet and outlet manifolds 62,64 respectively. At the back of each bank is a radiation reflector 66 which may be a ceramic material or a nickel alloy, such as Nimonic 105. The tubes 60 are shaped over their length to give a curvature which results in the radiant energy falling on the tubes per unit area decreasing along the length of the tubes at a rate which results in the tube temperature remaining substantially constant whilst that of the heat transfer medium increases. Thus, the radiant energy falling on the tubes 60 is greatest at the entry to the tubes and decreases towards the exit from the tubes.

The heat store 24 is an insulated, pressurised cylinder formed in post-tensioned concrete and containing about 700 tons of graded rock and/or brick which is the material receiving the heat energy from the heat transfer medium in the loop 22. The heat storage capacity of the heat store is such that the gas turbine power plant can run for a substantial period of time, e.g. 18 hours and providing that there was sufficient sunlight during the daylight hours, the power plant could run continuously giving a constant output on a 24 hours a day basis. Such an arrangement would not be affected by occasional clouds obscuring the sun.

We claim:

1. A solar energy power plant comprising:
   a closed cycle radiant energy collecting and storing system including a radiant energy collecting and directing means, a radiant energy heat receiving means for receiving radiant energy heat from said collecting and directing means, a relatively large capacity pressurized heat store means containing a heat retaining medium, a closed loop heat transfer line having a heat transfer medium therein, said heat transfer line extending from said heat store means to and through said radiant energy heat receiving means in heat exchange relationship to radiant energy heat received thereby and back to said heat store means in heat exchange relationship to the heat retaining medium, and pumping means for circulating the heat transfer medium through said closed circuit heat transfer line;
   a gas turbine engine comprising in flow series compressor means arranged to receive atmospheric air, said heat store means arranged to receive compressed air from said compressor means in heat exchange relationship so as to heat the same, and turbine means arranged to receive and be driven by the heated compressed air from said heat store means; and
   load means driven by said turbine means.

2. A power plant as claimed in claim 1 in which said radiant energy receiving means comprises at least one bank of tubes onto which radiant energy is directed by said radiant energy collecting and directing means, said heat transfer medium being pumped through said tubes, said tubes forming part of said closed loop heat transfer line which includes said substantially large heat capacity pressurized heat store means.

3. A power plant as claimed in claim 1 in which said radiant energy collecting and directing means comprises a plurality of hexagonal shaped mirrors arranged in a substantially circular array, and in which said radiant energy receiving means includes four radiant energy receivers, each quadrant of said circular array of mirrors being continually focused onto one of said four energy radiant receivers and said mirrors being located at ground level with said heat receiving means being located above the same on a tower.

4. A power plant as claimed in claim 1 including by-pass valve means for delivering at least a portion of the compressed air from the compressor means directly to said turbine means.

5. A power plant as claimed in claim 1 including heat exchanger means for receiving hot exhaust gases from said turbine means and discharging the same to atmosphere, and means for receiving and transferring compressed air from said compressor means and directing the same through said heat exchanger means in heat exchange relationship to the turbine exhaust gases passing therethrough, said last-mentioned means being arranged to deliver the heated compressed air to said heat store means for further heating.

6. A power plant as claimed in claim 5 including by-pass valve means for delivering at least a portion of the compressed air being transferred by said transfer means after being heated in said heat exchanger means directly to said turbine means.

7. A power plant as claimed in claim 6 in which said by-pass valve means may also direct at least a portion of compressed air directly from said compressor means to said turbine means without going through said heat exchanger means.

* * * * *